ated Nov. 9, 1971

United States Patent

[11] 3,618,983

[72] Inventor Harry D. Forse
220 Woods Road, Edgewood Addition, Anderson, Ind. 40611
[21] Appl. No. 883,826
[22] Filed Dec. 10, 1969
[45] Patented Nov. 9, 1971

[54] ANTIJACKKNIFING SYSTEM
16 Claims, 8 Drawing Figs.
[52] U.S. Cl. .................................................. 280/432,
303/3, 303/18, 303/21 CF
[51] Int. Cl. .................................................. B62d 53/06
[50] Field of Search .......................................... 280/432;
303/3, 21 CF, 18; 188/3

[56] References Cited
UNITED STATES PATENTS
3,073,623 1/1963 Owen .......................... 280/432
3,019,060 1/1962 Mallory ....................... 303/21 CF
3,005,643 10/1961 Dugan et al. ................. 280/432

Primary Examiner—Leo Friaglia
Attorney—Hood, Gust, Irish & Lundy

ABSTRACT: An antijackknifing system for a tractor-semitrailer combination. In one embodiment, a first fluid cylinder is provided having a piston with fluid on opposite sides thereof, the piston being linearly actuated in opposite directions, respectively, by turning movement of the steerable front wheels of the tractor in opposite directions from the center position. A second fluid cylinder is provided having a piston therein with fluid on opposite sides thereof, the piston being linearly actuated in opposite directions from a neutral position, respectively, by pivotal turning movement of the semitrailer with respect to the tractor in opposite directions from its centered position. A third fluid cylinder is provided having a piston with fluid on opposite sides thereof. A first conduit connects the three cylinders on one side of the respective pistons thereby providing a first closed fluid system, and a second conduit connects the three cylinders on the opposite sides of the respective pistons thereby providing a second closed fluid system so that movement of the piston of one of the first and second cylinders away from its neutral position without corresponding coordinated movement of the piston of the other of the first and second cylinders causes movement of the piston of the third cylinder away from its neutral position to accommodate fluid displaced by movement of the piston of the one cylinder. The piston of the third cylinder is coupled to increase the braking force exerted by the trailer brakes and simultaneously to decrease the braking force exerted by the tractor brakes in response to movement of the piston of the third cylinder away from its neutral position in either direction thereby to assist the driver in restoring a normal coordinated relationship between the position of the front wheels of the tractor and the pivotal position of the semitrailer with respect to the tractor.

INVENTOR:
HARRY D. FORSE,
BY Hood Gust, Crish & Lundy
ATTORNEYS.

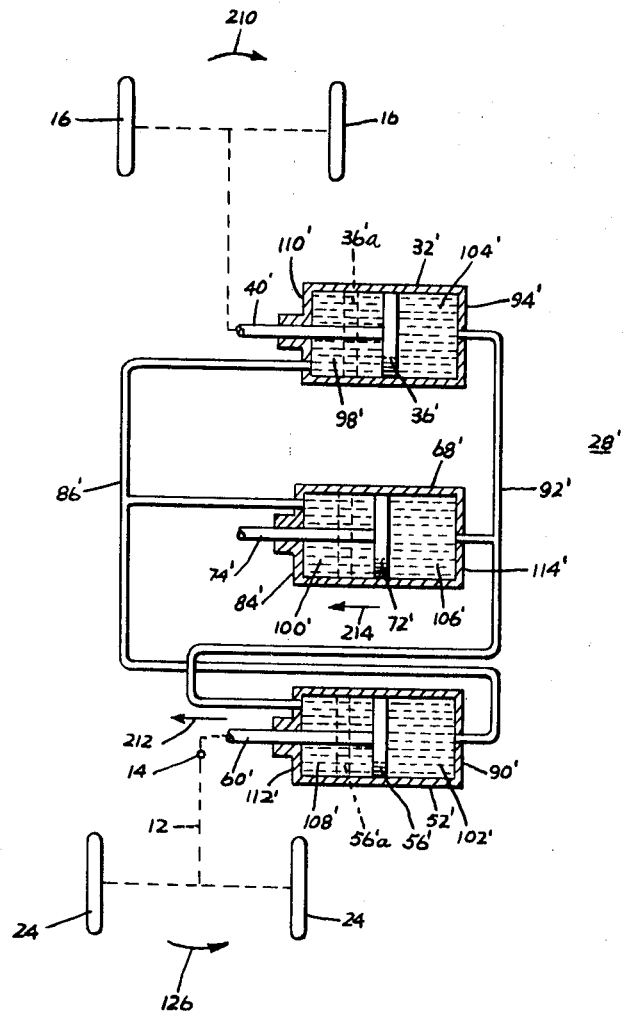

ANTIJACKKNIFING SYSTEM

BACKGROUND OF THE INVENTION

1. Field of the Invention

This invention relates generally to tractor-semitrailer combinations, and more particularly to an antijackknifing system for use with such combinations.

2. Description of the Prior Art

Conventional tractor-semitrailer combinations comprise a wheeled tractor or towing vehicle which has selectively actuable wheel brakes and steerable front wheels, and a wheeled semitrailer vehicle which has selectively actuable wheel brakes, the semitrailer being pivotally connected adjacent its forward end to the tractor adjacent its rear end by a so-called "fifth" wheel. Means are conventionally provided for normally selectively applying both the tractor and semitrailer brakes.

In normal operation of said tractor-semitrailer combination on a highway, the position of the front wheels and the pivotal position of the semitrailer with respect to the tractor is coordinated in train fashion. Thus, on a straight section of highway, the steerable front wheels of the tractor are centered and the semitrailer follows behind in a centered position with respect to the tractor. Further, in negotiating a normal turn in either direction, the steerable front wheels of the tractor will be turned in one direction away from the centered position, such as toward the right, and the semitrailer will be pivoted with respect to the tractor away from its centered position in the same direction, i.e., toward the right, the front wheels of the tractor and the trailer wheels thus being respectively positioned for making a coordinated turn.

By reason of the ability of the semitrailer to pivot with respect to the tractor, there is an ever-present hazard of the semitrailer skidding to one side or the other with respect to the tractor resulting in a situation commonly referred to as "jackknifing." Such jackknifing may be caused by a variety of conditions such as sudden application of the brakes or a steep descent so that the semitrailer tends to override the tractor, slippery road conditions, or the driver making a sudden turn. Once such jackknifing has commenced, it is often very difficult to stop and frequently results in complete loss of control of the vehicle and a resulting accident.

Various systems and devices have been proposed for eliminating or correcting jackknifing. One simple prior system merely provides fixed stops which limit the pivotal movement of the semitrailer with respect to the tractor. This arrangement, however, restricts maneuverability of the vehicle, such as when backing into a loading dock. Another prior system actuates the trailer brakes in response to a predetermined angular position of the semitrailer with respect to the tractor. Yet another prior system incorporates a brake associated with the fifth wheel which is actuated in response to a tendency for the semitrailer to override the tractor, or in response to a predetermined angular position of the semitrailer with respect to the tractor. Yet another prior system actuates the trailer brakes in response to centrifugal force due to skidding motion of the semitrailer. In still another prior system, force is applied to the fifth wheel mechanism in a direction to straighten the semitrailer with respect to the tractor.

Certain of the above-mentioned prior antijackknifing systems have required that not only the tractor, but also the trailer be specially modified. In the design of an antijackknifing system, it is particularly desirable that the additional apparatus required in the system be confined to the tractor to the end that any conventional semitrailer may be towed thereby. Further, since jackknifing generally occurs very rapidly, it is also highly desirable that the antijackknifing system be automatically actuated immediately upon the beginning of jackknifing.

SUMMARY OF THE INVENTION

The present invention operates on the premise that in normal operation of a tractor-semitrailer combination, the above-described coordinated relationship exists between the front wheels of the tractor and the semitrailer, jackknifing being evidenced by an uncoordinated turning movement of the semitrailer with respect to the front wheels. Further, jackknifing is known to occur by reason of the application of excessive braking force by the tractor brakes and/or insufficient braking force by the trailer brakes. Thus, in accordance with the invention, the braking effort applied by the tractor brakes is decreased and/or the braking effort applied by the trailer brakes is increased in response to the sensing of uncoordinated turning movement of the semitrailer with respect to the front wheels of the tractor.

The invention, in its broader aspects, therefore provides means for sensing the absence of a normal, coordinated relationship between the position of the front wheels of the tractor and the pivotal position of the semitrailer with respect to the tractor, and means for modifying the braking effort applied by at least one of the tractor and semitrailer brakes in response to the sensing means.

It is accordingly an object of the present invention to provide an improved antijackknifing system for use with a tractor-semitrailer combination.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 8 is a schematic illustration showing another embodiment of the invention.

DESCRIPTION OF THE PREFERRED EMBODIMENTS

Figure 1:
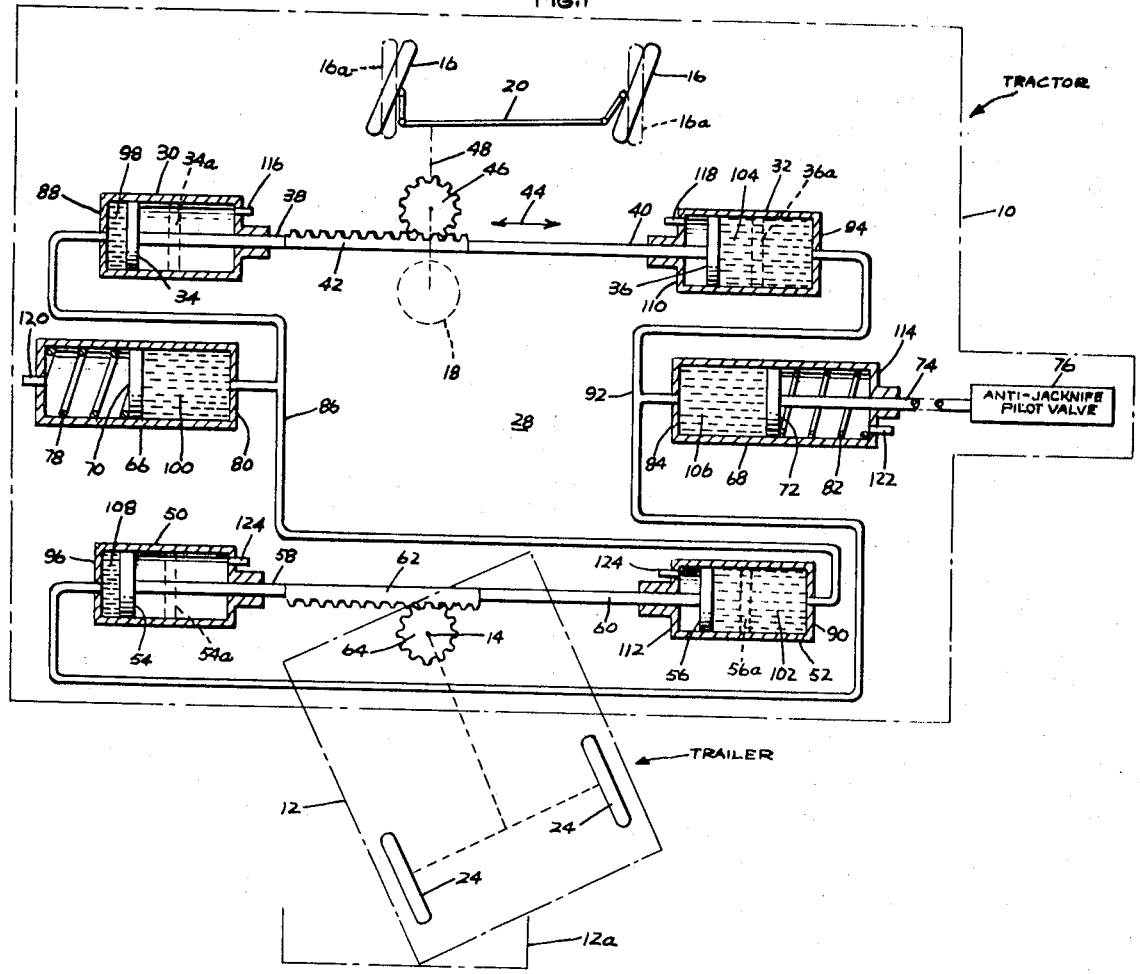
FIG. 1 schematically illustrates one embodiment of the invention with the front wheels of the tractor and the trailer positioned for a normal, coordinated turn.

Referring now to FIG. 1 of the drawings, a conventional tractor is designated by the dashed-line box 10 and a conventional semitrailer is designated by the dashed-line box 12, trailer 12 being pivotally connected adjacent its forward end to tractor 10 adjacent its rear end, as at 14, by a fifth wheel mechanism, such as that described below in conjunction with FIGS. 4, 5 and 6. Tractor 10 includes front wheels 16 which are steerable by a conventional steering wheel, shown by the dashed lines 18, through a conventional steering linkage indicated at 20. The steerable front wheels 16 and the rear wheels (not shown) of the tractor are provided with conventional brakes shown schematically at 22 in FIG. 7. Semitrailer 12 is provided with wheels 24 which are also provided with conventional brakes 26 as shown schematically in FIG. 7.

In accordance with the invention, an antijackknifing system 28 is provided mounted on the tractor 10. Antijackknifing system 28 comprises a first pair of fluid cylinders 30 and 32, respectively having pistons 34, 36 therein. Pistons 34, 36 respectively have piston rods 38, 40 associated therewith which, in the illustrated embodiment, are connected by a rack 42, pistons 34, 36 of cylinders 30, 32 thus moving in unison.

Rack 42 is moved linearly and in opposite directions, as shown by arrow 44, by a suitable gear 46 coupled to the steering shaft 48. Pistons 34, 36 have a neutral position generally midway between the opposite ends of the respective cylinders 30, 32 as shown by the dashed lines 34a, 36a, when the steerable front wheels 16 are centered as shown by the dashed lines 16a. Thus, when front wheels 16 are turned toward the right, as shown in solid lines in FIG. 1, gear 46 will drive rack 42 so as to move pistons 34, 36 toward the left ends of cylinders 30, 32, respectively, as shown in solid lines. Similarly, turning of front wheels 16 toward the left away from the centered position 16a will cause gear 46 to drive rack 42 toward the right thereby linearly to move pistons 34, 36 away from their neutral positions 34a, 36a toward the right ends of cylinders 30, 32, respectively.

A second pair of fluid cylinders 50, 52, is provided respectively having pistons 54, 56 therein. Pistons 54, 56 respectively have piston rods 58, 60 extending outwardly from the respective cylinders 50, 52 and connected by rack 62 so that pistons 54, 56 are simultaneously moved. Rack 52 is driven by a suitable gear 64 attached to the fifth wheel mechanism (FIGS. 4 and 5) so as to rotate with pivotal movement of trailer 12 with respect to tractor 10. With trailer 12 centered with respect to tractor 10, as shown by the dashed lines at 12a, pistons 54, 56 are in neutral positions generally midway between the opposite ends of the respective cylinders 50, 52 as shown by the dashed lines at 54a, 56a. With trailer 12 pivoted toward the right, as shown in FIG. 1, thus making a coordinated turn with the front wheels 16, gear 64 drives rack 62 and pistons 54, 56 toward the left ends of cylinders 50, 52, as shown in solid lines in FIG. 1. Similarly, when trailer 12 pivots toward the left from its centered position, gear 64 drives rack 62 toward the right thereby linearly to move pistons 54, 56 from their neutral positions 54a, 56a toward the right ends of cylinders 50, 52.

Figure 7:
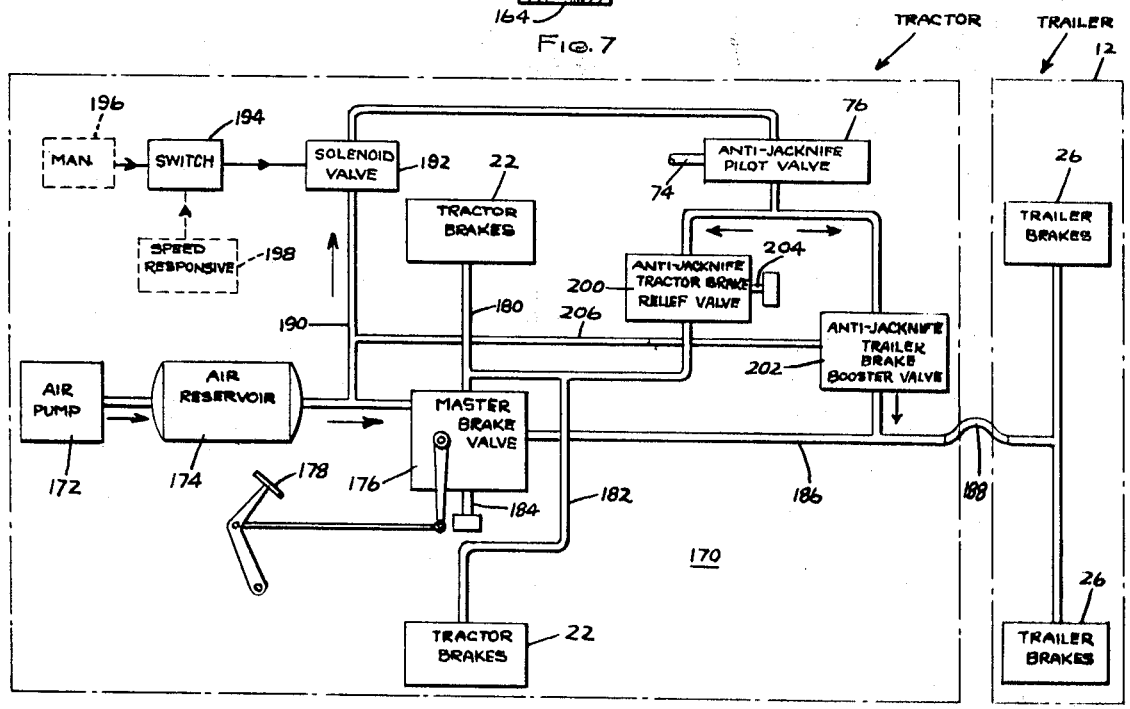
FIG. 7 is a schematic illustration of an airbrake system usable in conjunction with the antijackknifing system of the previous figures.

A third pair of cylinders 66, 68 is provided respectively having pistons 70, 72 therein. In the illustrated embodiment, cylinder 66 is of the free piston type, i.e., its piston 70 does not actuate, nor is it actuated by any external mechanism. Piston rod 74 is connected to piston 72 and actuates antijackknife pilot valve 76 (FIG. 7). Spring 78 in cylinder 66 urges free piston 70 toward end 80 of cylinder 66, while spring 82 in cylinder 68 urges piston 72 toward end 84 of cylinder 68.

A first fluid conduit 86 is connected to end 88 of cylinder 30, end 80 of cylinder 66, and end 90 of cylinder 52, while a second fluid conduit 92 is connected to ends 94 of cylinder 32, end 84 of cylinder 68 and end 96 of cylinder 50. Space 98 between piston 34 and end 88 of cylinder 30, space 100 between end 80 and piston 70 of cylinder 66, and space 102 between end 90 and piston 56 of cylinder 52 together with conduit 86 are filled with suitable hydraulic fluid, thus forming a closed fluid system. Similarly, space 104 between end 94 and piston 36 of cylinder 32, space 106 between end 84 and piston 72 of cylinder 68, and space 108 between end 96 and piston 54 of cylinder 50, together with conduit 92, are filled with suitable hydraulic fluid, thereby forming a second closed fluid system.

Cylinders 30, 32, 50 and 52 each have generally the same volume, while cylinders 66 and 68 each have an effective volume generally twice that of cylinders 30, 32, 50 and 52. The volume of the hydraulic fluid in each of the two closed fluid systems is substantially the same. Assuming now that front wheels 16 and semitrailer 12 are respectively centered, as shown in dashed lines at 16a, 12a, with pistons 34, 36, 54 and 56 thus at their neutral positions as shown in dashed lines at 34a, 36a, 54a, and 56a, the volume of the fluid in the two closed fluid systems is such that pistons 70, 72 of cylinders 66, 68, which serve as accumulator cylinders, will likewise be at neutral positions, as shown in solid lines in FIG. 1. Assuming further that the tractor-semitrailer is making a coordinated turn to the right with front wheels 16 turned to the right and semitrailer 12 pivoted to the right, as shown in FIG. 1, with the position of front wheels 16 and the pivotal position of semitrailer 12 being properly coordinated, pistons 34, 36 will be moved in unison by gear 46 toward ends 88, 110 of cylinders 30, 32, and pistons 54, 56 will similarly be moved in unison by gear 64 the same distance toward ends 96, 112, as shown in FIG. 1. With the turning movement of front wheels 16 and semitrailer 12 being coordinated, the fluid in space 98 of cylinder 30 displaced by movement of piston 34 toward end 88 will be transferred by conduit 86 into and accommodated in end space 102 of cylinder 52 by reason of the corresponding movement of piston 56 toward end 112. Similarly, the fluid in space 108 of cylinder 50 displaced by movement of piston 54 toward end 96 will be transferred by conduit 92 into and accommodated in end space 104 of cylinder 32 by reason of the corresponding movement of piston 36 toward end 110. Thus, the two closed fluid systems remain in a balanced condition, the volume of the fluid in spaces 100, 106 will remain the same, and there will be no movement of pistons 70, 72 in the accumulator cylinders 66, 68. It will be observed that springs 78, 82 which respectively urge pistons 70, 72 of cylinders 66, 68 toward ends 80, 114 cooperate to tend to resist movement of pistons 70, 72 when front wheels 16 are initially turned slightly to initiate a coordinated turn.

It will now be seen that during any operation of the tractor-semitrailer combination in which the positions of the front wheels 16 and the semitrailer 12 are coordinated, pistons 70, 72 of cylinders 66, 68 will remain in their neutral positions, and thus that the antijackknife pilot valve 76 will not be actuated.

Suitable vent ports 116, 118, 120, 122, 124 and 126 are preferably provided for cylinders 30, 32, 66, 68, 50 and 52, as shown.

Figure 2:
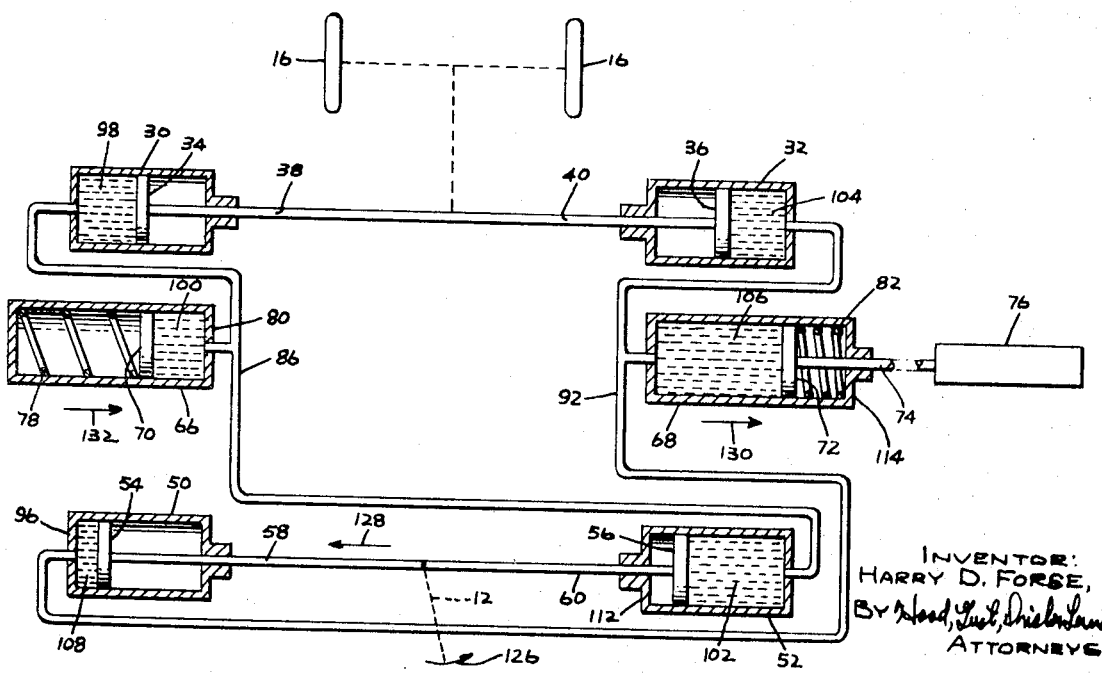
FIG. 2 is a schematic view similar to FIG. 1 showing the operation of the system during the beginning of jackknifing.

Referring now additionally to FIG. 2, it is assumed that the tractor-semitrailer combination was proceeding in a straight line with the front wheels 16 and semitrailer 12 in their respective centered positions and in longitudinal alignment. Thus, pistons 34, 36, 54, 56, 70 and 72 will be in their neutral positions, as described above. Assuming now that semitrailer 12 starts to jackknife toward the right, as shown by the arrow 126, pistons 54, 56 of cylinders 50, 52 will be moved in unison toward ends 96, 112 of those cylinders, as shown by the arrow 128, pistons 34, 36 of cylinders 30, 32 momentarily remaining in their initial neutral positions, since the driver has not yet attempted to correct the jackknifing condition by turning the front wheels 16 of the tractor 10 in the opposite direction, i.e., toward the left.

It will now be seen that the fluid in space 108 of cylinder 15 displaced by movement of piston 54 toward end 96 cannot be accommodated in space 104 of cylinder 32, to which cylinder 50 is connected by fluid conduit 92, since piston 36 remains in its initial neutral position. Thus, the fluid displaced from space 108 is forced through fluid conduit 92 and into space 106 of cylinder 68 causing piston 72 and piston rod 74 to be moved toward the right against the force exerted by spring 82, as shown by arrow 130, the fluid displaced from space 108 of cylinder 50 thus being transferred into and accommodated in space 106 of cylinder 68 by reason of corresponding movement of piston 72 in direction 130. This movement of piston rod 74 in direction 130 begins to actuate antijackknife pilot valve 76.

It will be seen that the corresponding movement of piston 56 of cylinder 52 in direction 128 increases the volume of space 102, there being no corresponding decrease in the volume of space 98 of cylinder 30 since piston 34 has remained in its initial neutral position. Thus, spring 78 in cylinder 66 forces piston 70 toward end 80 in the direction shown by the arrow 132, thereby correspondingly to reduce the volume of space 100 and to displace fluid therein through fluid conduit 86 into space 102 of cylinder 52.

As will hereinafter be more fully described in connection with FIG. 7 of the drawings, antijackknife pilot valve 76 is coupled in the braking system of the tractor-semitrailer 10, 12 and its actuation, as above described, reduces the braking effort applied by the tractor brakes 22 and increases the braking effort applied by the trailer brakes 26, thereby to assist the driver in correcting the jackknifing condition. It will further be observed that by reason of the fact that the two closed fluid systems, above described, are respectively maintained in balanced condition by springs 78, 82 in cylinders 66, 68, sudden, violent turning motion of the front wheels 16, which can cause occurrence of jackknifing, as above described, and also sudden jackknifing movement of semitrailer 12 is resisted, thus tending to prevent the occurrence of jackknifing and/or additionally to prevent worsening of a jackknifing condition.

Figure 3:
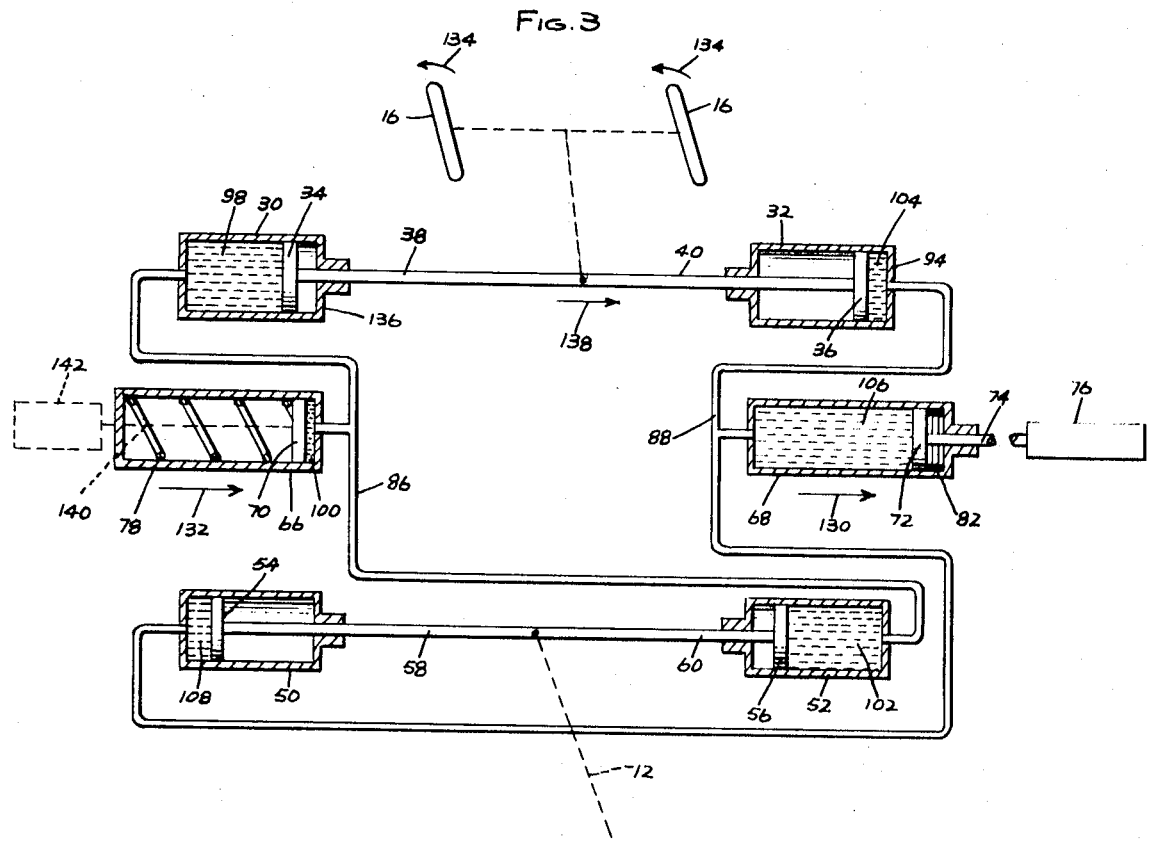
FIG. 3 is a schematic illustration similar to FIGS. 1 and 2 showing the system in a full jackknife situation.

Referring now additionally to FIG. 3, a full jackknife condition is shown in which the driver has now turned the front wheels 16 of tractor 10 toward the left, as shown by the arrows 134 in an effort to correct the situation. This left-turning movement of front wheels 16 results in simultaneous movement of pistons 34, 36 of cylinders 30, 32 toward the right, as shown by the arrow 138, toward cylinder ends 136, 94 thus reducing the volume of space 104 of cylinder 32 and increasing the volume of space 98. Reduction of the volume of space 104 of cylinder 32 by movement of piston 36 toward end 94 causes fluid to be displaced from space 104 through fluid conduit 88 and into space 106 of cylinder 68 thereby further to move piston 72 in direction 130 against spring 82, thereby further to move piston rod 74 and further to actuate antijackknife pilot valve 76. It will be observed that a corresponding movement of piston 34 of cylinder 30 toward end 136 has increased the volume of space 98 of cylinder 30, and thus spring 78 of cylinder 66 forces piston 70 further in direction 132 correspondingly to reduce the volume of space 100 and to displace the fluid therefrom through fluid conduit 86 into space 98 of cylinder 30.

It will be observed that as spring 82 in cylinder 68 is progressively compressed by movement of piston 72 in direction 130, as above described, its resistive force progressively increases, thus progressively resisting further jackknifing movement of semitrailer 12.

In the illustrated embodiment, antijackknife pilot valve 76 is of the type which is actuated in response to movement of piston rod 74 in either direction away from the neutral position of cylinder 72. Thus, it will readily be seen that the system functions in the identical manner, with the positions of the pistons merely reversed, in the case of the occurrence of jackknifing to the left, rather than to the right, as above described. It will further be readily understood that rather than providing a double-acting antijackknifing pilot valve 76 actuated in response to movement of piston 72 of cylinder 68 in either direction away from its neutral position, as above described, antijackknife pilot valve 76 may be of the single-acting type, and cylinder 66, rather than being of the free piston type as above described, may also be provided with a piston rod, as shown by the dashed line 140 in FIG. 3, which actuates another single-acting pilot valve, as shown by the dashed line 142. With this arrangement, the single-acting pilot valve 76 would be employed in the case of jackknifing to the right, as above described, and the single-acting pilot valve 142 would be employed in the case of jackknifing to the left.

Figure 4:
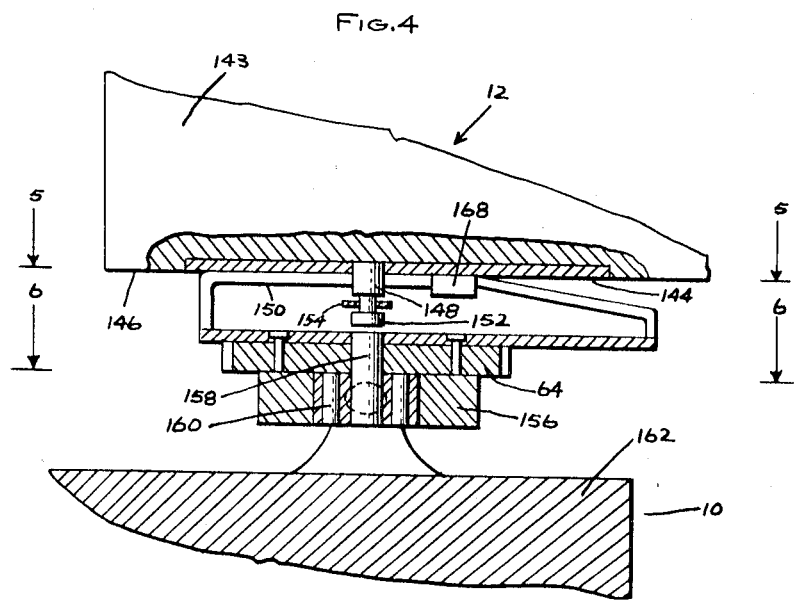
FIG. 4 is a fragmentary side view, partly in cross section, illustrating a fifth wheel mechanism usable with the embodiment of the previous figures.
Figure 5:
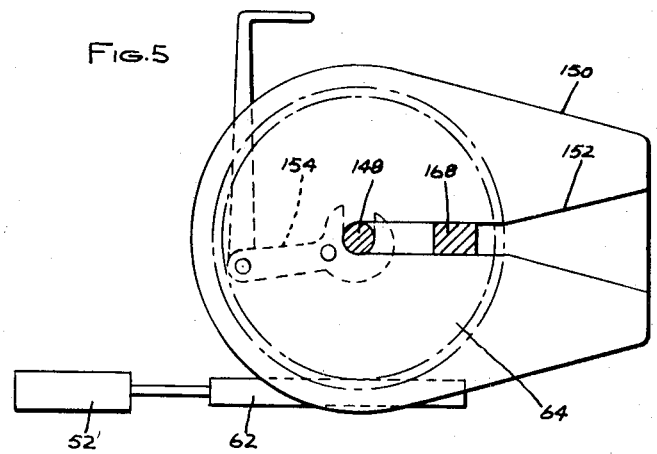
FIG. 5 is a top cross-sectional view taken generally along the line 5—5 of FIG. 4.
Figure 6:
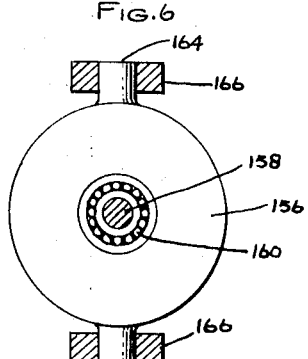
FIG. 6 is a top cross-sectional view taken generally along the line 6—6 of FIG. 4.

Referring now to FIGS. 4, 5 and 6, one form of fifth wheel mechanism usable in the system of FIG. 1 is shown. Here, front end 143 of semitrailer 12 has a plate 144 suitably secured to its bottom surface 146 to which kingpin 148 is secured. A somewhat conventional fifth wheelplate 150 is provided having the usual rearwardly opening slot 152 therein terminating in a semicircular forward end which receives kingpin 148. Kingpin 148 has a locking slot 152 formed therein which is engaged by a conventional locking mechanism, as shown by the dashed lines 154 in FIG. 5. Fifth wheelplate 150 has gear 64 secured thereto which drives rack 62, as above described. Fifth wheelplate 150 and gear 64 are rotatably mounted on a member 156 by means of shaft 158 and suitable thrust bearings 160. Member 156 is in turn mounted for rocking movement on rear end 162 of tractor 10 by means of suitable trunnions 164 supported by conventional pillow blocks 166 mounted on tractor 10. Plate 144 on semitrailer 12 has a block 168 which is received in slot 152 in fifth wheelplate 150 and thus causes fifth wheelplate 150 and gear 64 to turn with semitrailer 12.

Referring now to FIG. 7, an airbrake system for the tractor-semitrailer 10, 12 is schematically shown, generally indicated at 170. Here, a conventional air pump 172 supplies air to reservoir 174 which, in turn, is coupled to master brake valve 176. Master brake valve 176 is actuated by conventional brake pedal 178. Master brake valve 176 is coupled by lines 180, 182 to the tractor brakes 22, as shown. Thus, in conventional fashion, actuation of brake pedal 178 actuates master brake valve 176 to apply air pressure from air reservoir 174 through air lines 180, 182 to tractor brakes 22. Master brake valve 176 has a conventional air discharge port 184 and thus, upon deactuation of brake pedal 178, master brake valve 176 bleeds the air from the tractor brakes 22 thereby to release the same.

Another air line 186, including the conventional hose connection 188, couples master brake valve 176 to the trailer brakes 26 so that actuation of brake pedal 178 likewise causes master brake valve 176 to apply air pressure through air line 186 to apply trailer brakes 26, release of brake pedal 178 causing master brake valve 176 to bleed the air pressure from the trailer brakes. It will be understood that the air brake system 170, above described, is conventional, and has been shown and described in its most rudimentary form.

Another air line 190 is coupled to air reservoir 174, and is coupled by solenoid valve 192 to antijackknife pilot valve 76. Solenoid valve 192 is actuated to couple air line 190 to antijackknife pilot valve 76 by a suitable switch 194 which may be manually actuated by the driver, as shown by the dashed lines 196 and/or actuated by a suitable speed responsive device as shown by the dashed lines 198. Thus, in certain installations, it may be desirable to have the antijackknife system normally operative at all times, but to permit the operator to disable the system for close-in maneuvering of the tractor-semitrailer by actuation of manual switch 196, thereby to actuate solenoid valve 192 so as to disable pilot valve 76. In other installations, it may be desirable to have the antijackknife system normally disabled, so as to permit normal maneuvering of the tractor-semitrailer, and to enable the antijackknife system in response to speed responsive device 98, such as for example when the tractor-semitrailer reaches a speed of about 20 miles per hour.

In the specific embodiment, antijackknife pilot valve 76 is coupled to actuate both tractor brake relief valve 200 and trailer brake booster valve 202. Tractor brake relief valve 200 is coupled to air lines 180, 182 and is provided with a discharge port 204. Thus, actuation of tractor brake release valve 200 by pilot valve 76 will bleed air from the tractor brakes 22, thus to decrease the braking effort applied by the tractor brakes, despite the fact that the driver may be actuating brake pedal 178.

Air line 206 is connected to air line 190 and is coupled by trailer brake booster valve 202 to the trailer brake air line 186. Thus, upon actuation of trailer brake booster valve 202 by pilot valve 76, trailer brakes 26 are applied, even though the driver may not at the time be actuating brake pedal 178. On the other hand, if the driver is actuating brake pedal 178 so that master brake valve 176 applies air to the trailer brakes 26, actuation of the trailer brake booster valve 202 will apply additional air pressure to the trailer brakes 26 thereby to apply additional braking effort thereto. It will readily be understood that the pilot valve 76, tractor brake relief valve 200 and trailer brake booster valve 202 are of the modulating type, i.e., progressive actuation of pilot valve 76 by progressive movement of piston rod 74 in either direction away from the neutral position of piston 72 of cylinder 68 will progressively apply increased actuating air pressure to the relief valve 200 and booster valve 202, and in turn causing those valves progressively to decrease the braking effort applied by the tractor brakes 22 and to increase the braking effort applied by the trailer brakes 26, respectively. It will be readily understood that if separate single-acting pilot valves 76, 142 are employed, as above described, such valves would merely be coupled in parallel between solenoid valve 192 and release and booster valves 200, 202. Further, while employment of both the tractor brake relief valve 200 and trailer brake booster valve 202 is illustrated, and is considered to be preferred, it will be understood that either relief valve 200 or booster valve 202 may be eliminated in any given installation.

Referring now to FIG. 8, in which like elements are indicated by like reference numerals, and in which comparable elements are indicated by the same reference numeral with the suffix "'," piston 36' of cylinder 32' is coupled to front wheel 16 for linear movement in either direction away from its neutral position in response to turning of the front wheels 16 in either direction away from their centered position. Thus, with front wheels 16 centered, as shown, piston 36' is in its centered position, as shown in solid lines, and with front wheels 16 turned toward the right, as shown by the arrow 210, piston 36' is moved toward end 110' of cylinder 32', as shown by the dashed lines at 36a'. Piston 56' of cylinder 52' has its piston rod 60' coupled for actuation in response to pivotal turning movement of trailer 12 with respect to tractor 10. When the trailer 12 is centered with respect to tractor 10, piston 56' is in its neutral position, as shown in solid lines. With trailer 12 pivotally moving toward the right, as shown by the arrow 126, piston 56' is moved toward end 112' of cylinder 52' as shown by the dashed lines at 56a'.

Cylinder 68' has its piston 72' connected to piston rod 74' which is connected to actuate antijackknife pilot valve 76 (FIG. 1). Fluid conduit 86' connects ends 110' of cylinder 32', 84', of cylinder 68', and 90' of cylinder 52'. Fluid conduit 92' connects ends 94' of cylinder 32', 114' of cylinder 68' and 112' of cylinder 52'.

In this embodiment, each cylinder 32', 68' and 52' has fluid therein on both sides of its respective pistons 36', 72' and 56'. Thus, spaces 98', 100' and 102' respectively on one side of pistons 36', 72' and 56', together with fluid conduit 86', are filled with suitable hydraulic fluid, thus forming a first closed fluid system, and spaces 104', 106' and 108' on the other side of pistons 36', 72' and 56', together with fluid conduit 92, are likewise filled with suitable hydraulic fluid, thus forming a second closed fluid system.

It will now be readily seen that functionally the antijackknife system 28' of FIG. 8 operates in the same manner as the system 28 of FIG. 1. Thus, with wheels 16 being in the centered position as shown, pivotal movement of semitrailer 12 toward the right, as shown by the arrow 126, will result in movement of piston 56' of cylinder 52' toward the left, as shown by arrow 212. The fluid in the thus reduced space 108' is forced through fluid conduit 92' into space 106' causing piston 72' and piston rod 74' to move toward the left, as shown by the arrow 214, thereby to actuate antijackknife pilot valve 76. This leftward movement of piston 72' of cylinder 86' is possible since the fluid in the thus reduced space 100' is forced through fluid conduit 86' into and accommodated by the increased space 102' of cylinder 52'. It will be readily seen that the system functions in the identical manner in the case of jackknifing to the left.

It will be readily understood that while simplified rack and pinion arrangements 42, 46 and 62, 64 have been shown for actuating pistons 34, 36 of cylinders 30, 32, and pistons 54, 56 of cylinders 50, 52, other linkages may equally advantageously be employed for actuating the respective pistons.

While there have been described above the principles of this invention in connection with specific apparatus, it is to be clearly understood that this description is made only by way of example and not as a limitation to the scope of the invention.

What is claimed is:

1. In combination with a wheeled tractor vehicle having selectively actuable wheel brakes and steerable front wheels, a wheeled semitrailer vehicle having selectively actuable wheel brakes, means for pivotally coupling said semitrailer to said tractor, and means for normally selectively applying said tractor and semitrailer brakes; an antijackknifing system comprising: means for sensing the absence of a normal coordinated relationship between the steered position of said front wheels and the pivotal position of said semitrailer wit respect to said tractor, said normal relationship occurring when said tractor and semitrailer are normally traveling a highway; and means for modifying the braking effort applied by at least one of said tractor and semitrailer brakes in response to said sensing means thereby to assist the driver in restoring said normal relationship.

2. The system of claim 1 wherein said modifying means increases the braking effort applied by said trailer brakes in response to said sensing means.

3. The system of claim 1 wherein said modifying means decreases the braking effort applied by said tractor brakes in response to said sensing means.

4. The system of claim 3 wherein said modifying means further simultaneously increases the braking effort applied by said trailer brakes in response to said sensing means.

5. The system of claim 1 wherein said sensing means includes first means for sensing turning movement of said front wheels in either direction, second means for sensing pivotal turning movement of said semitrailer with respect to said tractor in either direction, and third means coupled to both of said first and second means and responsive thereto for sensing an uncoordinated turning movement of said front wheels with respect to said semitrailer.

6. The system of claim 5 wherein said first means includes at least a first fluid cylinder having fluid and a piston therein and means for linearly actuating said piston in response to said turning movement of said front wheels; said second means including at least a second fluid cylinder having fluid and a piston therein and means for linearly actuating said piston in response to said turning movement of said semitrailer; said third means including at least a third fluid cylinder having fluid and a piston therein, and fluid conduit means for coupling said first, second and third cylinders in a closed fluid system whereby movement of said piston of one of said first and second cylinders in the absence of corresponding coordinated movement of said piston of the other of said first and second cylinders causes movement of said piston of said third cylinder thereby to accommodate the fluid displaced by movement of said piston of said one cylinder; said modifying means being coupled to said piston of said third cylinder and actuated thereby in response to movement thereof.

7. The system of claim 6 wherein said piston of said third cylinder is in a neutral position in response to said normal relationship, said piston of said third cylinder being moved toward one end thereof in response to uncoordinated turning movement of said semitrailer with respect to said front wheels in one direction, and toward the other end thereof in response to uncoordinated turning movement in the opposite direction, said modifying means being actuated in response to movement of said piston of said third cylinder in either direction away from said neutral position.

8. The system of claim 7 wherein said modifying means includes first auxiliary means for selectively decreasing the braking effort applied by said tractor brakes, second auxiliary means for selectively increasing the braking effort applied by said trailer brakes, and actuator means coupled to said piston of said third cylinder for actuating said first and second auxiliary means.

9. The system of claim 8 wherein said tractor and semitrailer brakes are air actuated, said first auxiliary means comprising a first valve for bleeding air from said tractor brakes, said second auxiliary means comprising a second valve for increasing the air pressure applied to said trailer brakes, said actuator means comprising a pilot valve coupled to said first and second valves for actuating the same.

10. The system of claim 5 wherein said first means includes a first pair of first and second fluid cylinders each having fluid and a piston therein, means for coupling said pistons of said first and second cylinders for simultaneous movement, and means for linearly simultaneously actuating said pistons of said first and second cylinders in response to said turning movement of said front wheels; said second means including a second pair of third and fourth fluid cylinders each having fluid and a piston therein, means for coupling said pistons of said third and fourth cylinders for simultaneous movement, and means for linearly simultaneously actuating said pistons of said third and fourth cylinders in response to said turning movement of said semitrailer; said third means including a third pair of fifth and sixth cylinders each having fluid and a piston therein, and first fluid conduit means for coupling said first, third and fifth cylinders in a first closed fluid system and second fluid conduit means for coupling said second, fourth and sixth cylinders in a second closed fluid system whereby movement of the pistons of one of said first and second pairs of cylinders in the absence of corresponding coordinated movement of the pistons of the other of said first and second pairs of cylinders causes movement of the pistons of said third pair of cylinders thereby to accommodate the fluid respectively displaced by movement of the pistons of said one pair of cylinders, said modifying means being coupled to the piston of at least one of said third pair of cylinders and actuated thereby in response to movement thereof.

11. The system of claim 10 wherein said fifth and sixth cylinders respectively have spring means therein for urging the respective pistons in a direction to discharge fluid therefrom.

12. The system of claim 11 wherein said modifying means includes first auxiliary means for selectively decreasing the braking effort applied by said tractor brakes, second auxiliary means for selectively increasing the braking effort applied by said trailer brakes, said pistons of said third pair of cylinders respectively having a neutral position in response to said normal relationship, one of said third pair of cylinders being of the free piston type, and actuator means coupled to said piston of the other of said third pair of cylinders and to said first and second auxiliary means for actuating the same in response to movement of said last-named piston in either direction away from its neutral position.

13. The system of claim 11 wherein said modifying means includes first auxiliary means for selectively decreasing the braking effort applied by said tractor brakes, second auxiliary means for selectively increasing the braking effort applied by said trailer brakes, said pistons of said third pair of cylinders respectively having a neutral position in response to said normal relationship, said piston of said fifth cylinder being moved toward one end thereof against the force exerted by the respective spring means in response to uncoordinated turning movement of said semitrailer with respect to said front wheels in one direction, said piston of said sixth cylinder being moved toward one end thereof against the force exerted by the respective spring means in response to uncoordinated turning movement in the opposite direction, first actuator means coupled to said piston of said fifth cylinder and to said first and second auxiliary means for actuating the same in response to said uncoordinated turning movement in said one direction, and second actuator means coupled to said piston of said sixth cylinder and to said first and second auxiliary means for actuating the same in response to said uncoordinated turning movement in said opposite direction.

14. The system of claim 5 wherein said first means includes a first fluid cylinder having a piston therein with fluid respectively on the opposite sides thereof and means for linearly actuating said piston in response to said turning movement of said front wheels; said second means including a second fluid cylinder having a piston therein with fluid respectively on the opposite sides thereof and means for linearly actuating said piston in response to said turning movement of said semitrailer; said third means including a third fluid cylinder having a piston therein with fluid respectively on opposite sides thereof, and first fluid conduit means for coupling said first, second and third cylinders on one side of the respective pistons in a first closed fluid system and second fluid conduit means for coupling said first, second and third cylinders on the other side of the respective pistons in a second closed fluid system whereby movement of said piston of one of said first and second cylinders in the absence of corresponding coordinated movement of said piston of the other of said first and second cylinders causes movement of said piston of said third cylinder thereby to accommodate the fluid displaced by movement of said piston of said one cylinder; said modifying means being coupled to said piston of said third cylinder and actuated thereby in response to movement thereof.

15. The system of claim 1 further comprising means for selectively enabling and disabling said antijackknifing system.

16. The system of claim 15 wherein said last-named means includes speed responsive means for enabling said antijackknifing system in response to a predetermined speed of said trailer and semitrailer.

* * * * *